United States Patent
Marwinski et al.

(10) Patent No.: US 9,645,845 B2
(45) Date of Patent: May 9, 2017

(54) TRIGGERING JOB EXECUTION IN APPLICATION SERVERS BASED ON ASYNCHRONOUS MESSAGES SENT BY SCHEDULING TASKS

(75) Inventors: Dirk Marwinski, Heidelberg (DE); Thomas Mueller, Karlsruhe (DE)

(73) Assignee: SAP SE, Walldorf (DE)

( * ) Notice: Subject to any disclaimer, the term of this patent is extended or adjusted under 35 U.S.C. 154(b) by 1695 days.

(21) Appl. No.: 12/238,681

(22) Filed: Sep. 26, 2008

(65) Prior Publication Data
US 2009/0089785 A1    Apr. 2, 2009

Related U.S. Application Data

(60) Provisional application No. 60/975,562, filed on Sep. 27, 2007.

(51) Int. Cl.
G06F 9/48    (2006.01)
G06F 9/46    (2006.01)

(52) U.S. Cl.
CPC ............ *G06F 9/4843* (2013.01); *G06F 9/465* (2013.01); *G06F 9/4825* (2013.01); *G06F 2209/482* (2013.01)

(58) Field of Classification Search
CPC ............................. G06F 9/465; G06F 9/4843
USPC ........................................................ 718/102
See application file for complete search history.

(56) References Cited

U.S. PATENT DOCUMENTS

| | | | |
|---|---|---|---|
| 6,598,067 B1 * | 7/2003 | Wydra et al. | 718/100 |
| 6,944,862 B2 * | 9/2005 | Caggese et al. | 718/102 |
| 2005/0273674 A1 * | 12/2005 | Shinn et al. | 714/55 |
| 2008/0148264 A1 * | 6/2008 | Neichev | 718/102 |

OTHER PUBLICATIONS

Panda (Using Timers in J2EE Applications); Published on ONJava.com, Oct. 13, 2004; 11 pages; accessed on Sep. 6, 2011 at: http://tim.oreilly.com/lpt/a/5267.*
SAP (SAP Central Process Scheduling by Redwood); 2007; 27 pages.*
Bosanac (Job Scheduling in Java); Published on ONJava.com, Mar. 10, 2004; 13 pages; accessed on Sep. 6, 2011 at: http://oreilly.com/lpt/a/4637.*
Fong (Asynchronous processing in WebSphere Process Server); developerWorks, Apr. 29, 2009; 26 pages; accessed on Sep. 6, 2011 at: http://www.ibm.com/developerworks/websphere/library/techarticles/0904_fong/0904_fong.html.*
Tschense-Oesterle (Expect More from Your Job Scheduling Solution); SAP Insider, Jul.+Aug.+Sep. 2008 issue, 5 pages.*
Panda (Using Timers in J2EE Applications); Published on ONJava.com, Oct. 13, 2004; 11 pages; accessed on Sep. 6, 2011 at: http://tim.oreilly.com/lpt/a/5267 (with respect to Figure 1 on p. 3).*
Mike Brevoort, Sr. Associate, Mike Steinley, Sr. Associate, Heather Spinnenweber, Sr. Associate, A Distributed Component Architecture Model, Oct. 2004; 11 pages.*

* cited by examiner

*Primary Examiner* — Keith Vicary

(57) ABSTRACT

A method and a system for job scheduling in application servers. A common metadata of a job is deployed, the job being a deployable software component. An additional metadata of the job is further deployed. A scheduler task based on the additional metadata of the job is created, wherein the task is associated with a starting condition. The scheduler task is started at an occurrence of the starting condition, and, responsive to this an execution of an instance of the job is invoked asynchronously.

19 Claims, 12 Drawing Sheets

400

```
<?xml version="1.0" encoding="UTF-8"?>
<ejb-j2ee-engine xmlns:xsi="http://www.w3.org/2001/XMLSchema-instance">
<enterprise-beans>
<enterprise-bean>
<ejb-name>HelloWorldBean</ejb-name>
<jndi-name> HelloWorldBean </jndi-name>
<message-props>
<destination-name>JobQueue</destination-name>
<connection-factory-name>JobQueueFactory</connection-factory-name>
</message-props>
</enterprise-bean>
</enterprise-beans>
</ejb-j2ee-engine>
```

Figure 4A

405

```
<?xml version="1.0" encoding="UTF-8"?>
<application-j2ee-engine xmlns:xsi="http://www.w3.org/2001/XMLSchema-instance">
<provider-name>sap.com</provider-name>
<reference reference-type="hard">
<reference-target provider-name="sap.com" target-type= "service">
scheduler~runtime
</reference-target>
</reference>
<modules-additional>
<module>
<entry-name>HelloWorldProject.jar</entry-name>
<container-type>scheduler~container</container-type>
</module>
</modules-additional>
</application-j2ee-engine>
```

Figure 4B

410

```
<job-definitions>
<job-definition name="HelloWorldJob">
</job-definition>
</job-definitions>
```

Figure 4C

* Multiple usage of this element is possible

Legend: execute instances of child jobs (810-820) by a parent job (805)

Legend: pause execution of a parent job (830) while a child job (835) executes

Legend: execute jobs in chain and/or in parallel (850 and 870, or 850 and 860-865)

Legend: interrupting (930) periodic executions of instances of a job (905-925)

Legend: delaying (950) periodic execution of instances of a job (940-945)

Legend: resolve execution conflicts (965-970 and 975-980) between instances of a job (960-990)

TRIGGERING JOB EXECUTION IN APPLICATION SERVERS BASED ON ASYNCHRONOUS MESSAGES SENT BY SCHEDULING TASKS

This application claims priority to U.S. Provisional Patent Application Ser. No. 60/975,562, titled "Job scheduling for java application servers", filed Sep. 27, 2007, which is hereby incorporated by reference.

FIELD OF INVENTION

The field of invention relates generally to electronic data processing in multi-tier computer systems and more particularly to scheduling job execution in application servers.

BACKGROUND

IT landscapes and business processes are becoming more complex on a daily basis. Automating these processes could simplify the IT architecture and reduce some of the errors and issues caused through human error. In addition, asynchronous execution of background processes in computer systems has become increasingly important for many business applications. The execution of business processes may take hours or days (for example, assessing the risk of a complex financial portfolio, performing billing and dunning operations for millions accounts, etc.) As state of the art computer systems, and more specifically the application servers provided by various vendors, are transaction oriented, it becomes more difficult, if not impossible, to submit requests for execution of background processes or jobs and to monitor the progress of the execution.

Currently, there is no universally agreed standard for asynchronous processing of jobs in Java Application Server (Java AS). Java AS basic features are standardized in Java Enterprise Edition™ (Java EE) specification. The standard defines a very low level of abstraction for asynchronous processing on the application programming interface (API) level that is not sufficient for a complex business application in most cases. The current Java EE platform includes "java.util.Timer" and the Enterprise JavaBean™ (EJB) Timer Service. These solutions are not flexible enough to support the typically required range of scheduling jobs. Scheduling jobs scenarios that currently present a challenge include:
- Long running jobs, e.g., complex calculations, month-end closing, etc., in which it must be ensured that the calculations run exactly once and that any errors are reported to the business.
- Streaming jobs, e.g., pricing and billing jobs, in which the processing involves large volumes of data handled in parallel, usually performed in clustered environments.
- Background jobs that may span multiple heterogeneous systems, in which processing on one system depends on successful completion of another job on another system.

Some vendors (Oracle Corp, IBM Corp, OpenSymphony Quartz—open source) have developed their own proprietary scheduling solutions. Some third party vendors (Redwood Software) have included Java EE in the set of their supported platforms. Despite this, there is a growing need for an integrated solution that provides services to internal and external users for asynchronous execution of business processes. Further, proprietary solutions do not consistently address important issues such as:

- Monitoring and error handling—it is not possible to determine which jobs were run when, by whom, and to correlate logging information with a job for analysis if an error occurs.
- Managing background processing in multiple applications—ad-hoc solutions cannot handle a large number of jobs or when processes consist of jobs in multiple applications.
- Integrating with non-Java processing—complex business processes often run in connection with Java and non-Java systems.

SUMMARY

A method and a system for job scheduling in application servers are described. A common metadata of a job is deployed, the job being a deployable software component. An additional metadata of the job is further deployed. A scheduler task based on the additional metadata of the job is created, wherein the task is associated with a starting condition. The scheduler task is started at an occurrence of the starting condition, and, responsive to this, an execution of an instance of the job is invoked asynchronously.

BRIEF DESCRIPTION OF THE DRAWINGS

A better understanding of the present invention can be obtained from the following detailed description in conjunction with the figures of the accompanying drawings in which like references indicate similar elements. It should be noted that references to "an" or "one" embodiment in this disclosure are not necessarily to the same embodiment, and such references mean at least one.

FIG. 4A illustrates a sample deployment descriptor file providing messaging service related metadata for a job MDB to a container, according to one embodiment of the invention.

FIG. 4B illustrates a sample deployment descriptor file providing execution related metadata for a job MDB to a container, according to one embodiment of the invention.

FIG. 4C illustrates a sample deployment descriptor file providing job definition metadata to a scheduler, according to one embodiment of the invention.

DETAILED DESCRIPTION

Figure 1:
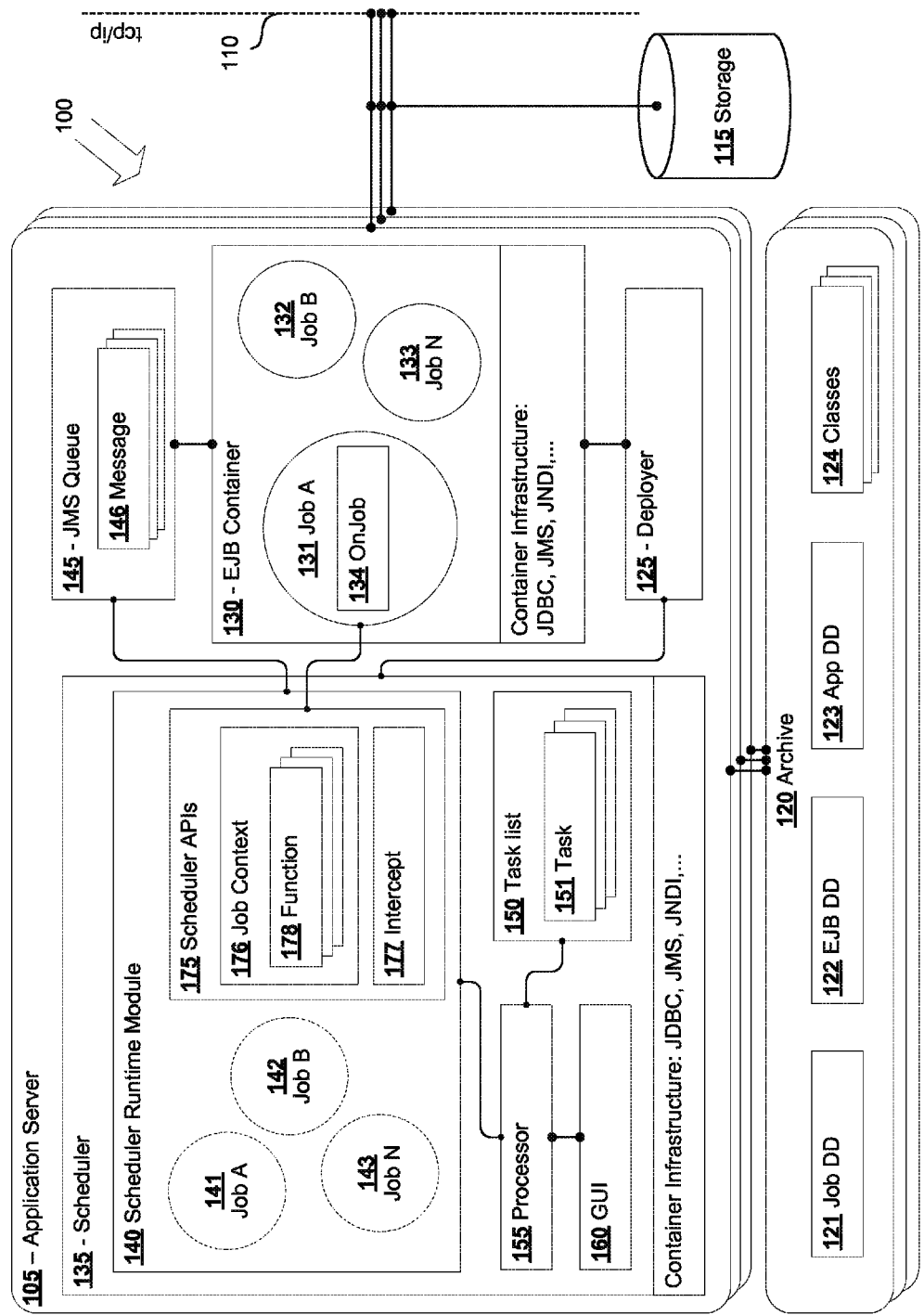
FIG. 1 illustrates a block diagram of a system for job scheduling in application servers, according to one embodiment of the invention.

Embodiments of a method and a system for providing job scheduling in application servers are described.

This specification presents a solution that addresses not only the limitations of current programming models, but also provides a solution for common operational issues. Embodiments consistent with the present teachings of the invention are built using standard Java EE technology. However, it will be obvious for one skilled in the art that other technologies could be used for building alternative embodiments of the invention, for example, the Microsoft .Net™ application platform.

The present invention allows application developers to concentrate on developing business logic for their background processes by providing standardized support for background processing. Moreover, this solution provides interoperability by using an open interface. Thus, integration with an external scheduler allows co-operative management of jobs in Java and non-Java applications.

As used herein, the term "job" means a process that includes system or business functionality and that is executed within a computer system. Jobs that provide functionality of business systems are executed by application servers. Application servers are provided by various vendors and their basic specifications correspond to established standards. For example, SAP AG NetWeaver™ Java application server (Java AS) and IBM Corp WebSphere™ Java AS, both corresponding to Java EE specification. The jobs are installed or deployed in the application servers as program components or beans, e.g., Message Driven Beans (MDB) object, according to one embodiment of the invention. Java application servers execute one or more instances of the deployed jobs.

The described embodiments of the invention provide implementation of a scheduler that can be used to schedule applications or jobs. The implementation is aligned with the standard Java AS installation. With this new capability, customers and partners are able to develop applications to automate the business processes running on a Java AS. The jobs are implemented on the basis of message-driven beans. The execution of jobs is handled by a container in the Java AS. An instance of a job is executed when it receives a Java Messaging Service (JMS) message sent by the scheduler. In a cluster environment, the JMS also is responsible for load balancing: it decides which job instance on which node gets the request to run. From a purely scheduling perspective, a job is executed when a certain start condition, such as a particular time of the day, is fulfilled.

As used herein, the term "job definition" means the blueprint representation of a job, also called job metadata, which is deployed on the application server in a scheduler. The job metadata includes a name for the job definition, a description, and a list or parameters which need to be specified when triggering the job. A job definition is not bound to any start conditions, and thus is not a job that is scheduled and ready to run.

As used herein, the term "scheduler job" means an instance of a deployed job definition, corresponding to an instance of a deployed job that runs or has performed a certain amount of work at a particular point in time. It contains all the state information from the job such as the start time, end time, provided parameters, return code, and the job log. One job runs in one thread.

As used herein, the term "scheduler task" or simply "task" means an item that contains the start conditions and parameter values for a job definition. A scheduler task instructs the scheduler which job to instantiate and run, when to run the job, and with which parameters. A scheduler task can trigger a single or multiple instances of a job. As an example, consider a job definition for a payroll job which calculates the salary of all employees. An instance of the corresponding job is usually run once a month. The scheduler task instructs the scheduler to invoke an execution of an instance of the payroll job at the 20th of every month.

FIG. 1 is a block diagram of system 100 for job scheduling in application server, according to one embodiment of the invention. System 100 includes application server 105 that in the particular embodiment is a Java AS. Application server 105 could be implemented either as a standalone server node, or as a cluster of server nodes. In various embodiments, application server 105 has, but is not limited to, the structure illustrated on FIG. 1. Application server 105 is accessible by external systems and customers through network 110. In the particular embodiment, network 110 implements transmission control protocol/internet protocol (TCP/IP) in accordance with the Internet Protocol Suite standard.

Application server 105 accesses and persists relevant data on storage 115. In an alternative embodiment, storage 115 may not be a separate unit of system 100, and the provided functionality could be part of application server 105. Archives 120 deliver installable program components to application server 105. The installable program components, including a number of deployment descriptors (DDs) 121-123 and classes 124, are packed in archives 120, e.g., enterprise application archive (EAR) files.

Classes 124 contain the program code defining the business functionality of the installable program component. Classes 124 are developed as message driven bean (MDB) classes. MDBs are program components deployable in Entity JavaBean (EJB) container of Java AS, according to Java Enterprise Edition (Java EE) standard. When deployed, MDBs are started in response of receiving an addressed JMS message at the EJB container.

Deployment descriptors 121-123 contain descriptive information of the deployable program components. In this document this representation is also referred to as metadata. EJB DD 122 and application DD 123 provide environment metadata that is required for deployment of MDBs in EJB container 130 of Java AS 105. Job DD 121 provides additional metadata, required for scheduling the execution of the deployed MDBs. Alternatively, instead of using deployment descriptors, metadata could be provided with annotations included directly in classes 124, according to Java EE specification.

The installation of applications on application server 105 is performed by deployer 125 module. Deployer 125 reads archives 120 and installs MDBs in EJB container 130. The installed MDBs could be one or more than one, and are illustrated in FIG. 1 as job A 131, job B 132 and job N 133. EJB container 130 is a standard infrastructure module of Java AS, according to Java EE standard specification. EJB container 130 provides execution environment to the installed components and integration with other Java AS components through interfaces such as:

Java Database Connectivity (JDBC) for reading and managing persistent data,

Java Naming Directory Interface (JNDI) providing unified interface to multiple naming and directory services, Java Messaging System (JMS) application programming interface (API) providing interaction with JMS infrastructure, Java Transaction API (JTA) providing integration with a transaction manager for executing distributed transactions, Java EE connector architecture (JCA) providing connectivity with external systems, i.e. Enterprise Information Systems (EIS), etc.

Deployer 125 transfers the additional metadata contained in job DD 121 in scheduler 135, where it is deployed as job definitions for the MDBs. Scheduler 135 is a Java AS infrastructure module to provide services for asynchronous scheduling the executions of the deployed MDBs. Scheduler 135 is developed in accordance with Java EE specification and provides execution environment and container infrastructure similar to EJB container 130, including JDBC, JNDI, JMS, etc.

Besides the standard container infrastructure, Scheduler 135 includes scheduler runtime module 140, in which the additional metadata for the deployed program components is received. The additional metadata of the MDBs is illustrated in FIG. 1 as job A 141, job B 142 and job N 143, representing job definitions for job A 131, job B 132 and job N 133, respectively. Scheduler 135 uses job A 141, job B 142, etc., to asynchronously invoke an execution of an instance of the corresponding MDBs deployed in EJB container 130. The execution is invoked with the help of JMS messages that are sent from scheduler runtime module 140 to EJB container 130 through JMS queue 145. JMS queue 145 stores messages 146 and asynchronously delivers them to EJB container 130, where an execution of an instance of a corresponding MDB is triggered.

Scheduler runtime module 140 sends messages 146 to EJB container 130 through JMS queue 145 in accordance with a scheduled task list 150. For each deployed job definition 141-143 in scheduler, an arbitrary number of corresponding tasks 151 in tasklist 150 could be created. Tasks 151 are associated to job definitions 141-143 and for each task an execution schedule, or start-up events, is specified. The execution schedule could be, for example, fixed start date and time or recurrent time event. Start-up event could be any type of system event that could be used to trigger an execution of a program module, recognized by a person skilled in the art. Scheduled tasks also provide input data required in execution of the instances of the corresponding jobs.

Scheduler 135 further includes processor 155 to execute logic for creating, scheduling, and triggering tasks 151 in task list 150. Tasks 151 may be created manually through graphical user interface (GUI) 160. GUI 160 visualizes information and includes controls to create tasks 151, associate tasks to job definitions 141-143, define execution schedule for tasks 151, specify input parameters for execution of instances of the corresponding jobs 131-133, monitor execution of tasks 151 (respectively of jobs 131-133), and access execution log files.

Figure 10:
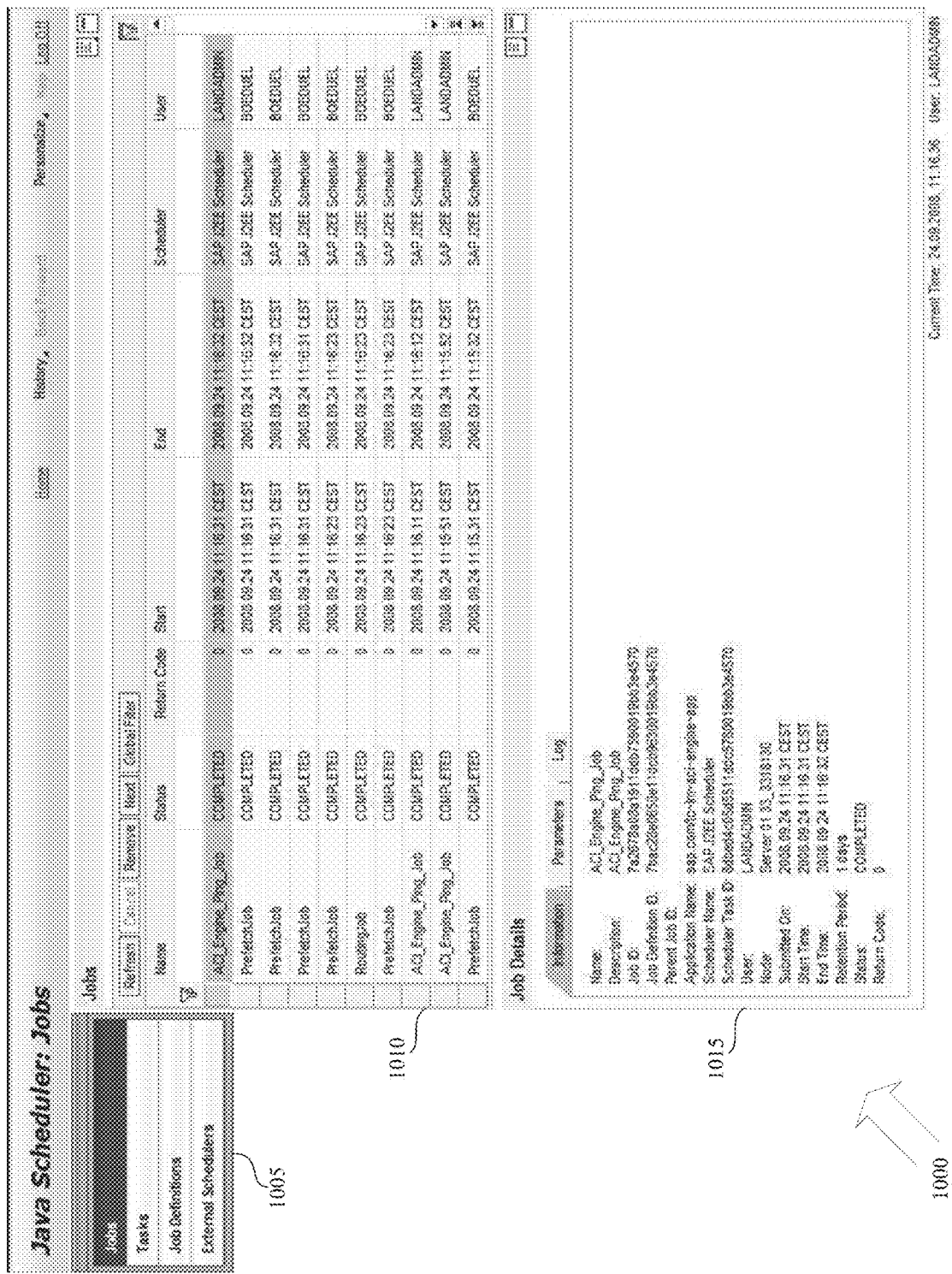
FIG. 10 illustrates an embodiment of a graphical user interface (GUI) of a scheduler computer application.

GUI 160 further displays information and includes controls to create execution schedule for the deployed job definitions 141-143 and for administrating the overall job execution process. FIG. 10 illustrates an embodiment of a GUI 1000 of scheduler 135. The screen of the GUI 1000 is separated in three areas to provide nested scheduling information. Area 1005 is a menu to open particular information in the second area 1010. Specifically for FIG. 10, the first area is chosen "Jobs" menu item and the second area 1010 lists instances of jobs. This area provides basic information comprising "job name", status of the job instance", "return code", instance "start time" and "end time", "user" who scheduled the job, etc. The list could be refreshed, filtered, deleted, scrolled, etc. When a user chooses a job instance item from the list, the third area 1015 displays detailed information for the corresponding job, as illustrated in the figure, including the job definition metadata, parameters, and all logged execution details.

Figure 11:
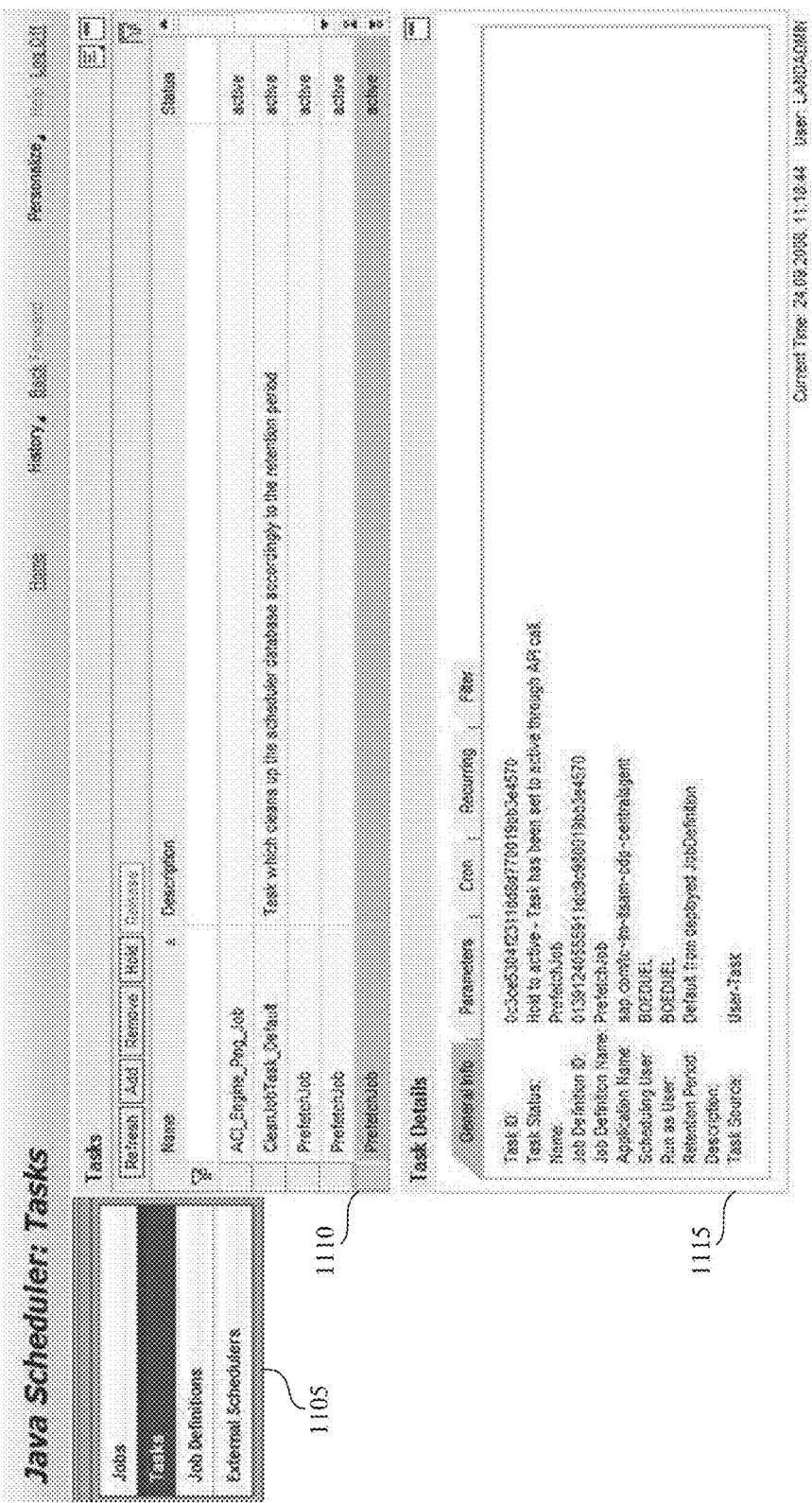
FIG. 11 illustrates an embodiment of a graphical user interface (GUI) of a scheduler computer application.

FIG. 11 illustrates an embodiment of the GUI 1100 of scheduler 135, in which in the first area 1105 "Tasks" menu item is selected. In this case, the second area 1110 lists the tasks 151 that are created for providing execution schedule and input parameter for the scheduled jobs. The second area 1110 provides controls for accessing functionalities that allow creating of a new task, removing of an existing task, holding the execution of a task, etc. In the third area 1115, detailed information for a task selected in the second area 1110 is displayed, as illustrated in the figure.

Figure 12:
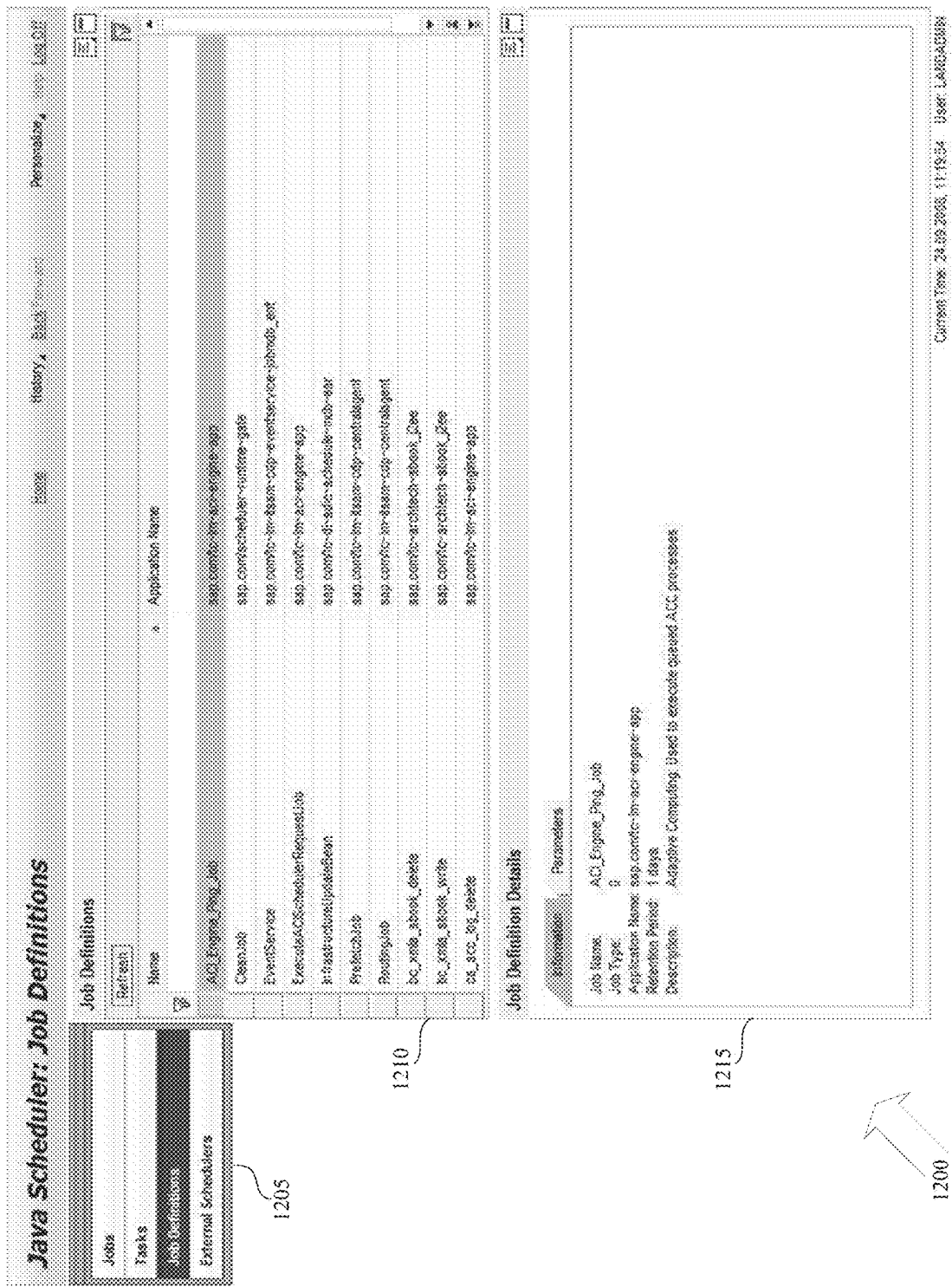
FIG. 12 illustrates an embodiment of a graphical user interface (GUI) of a scheduler computer application.

FIG. 12 illustrates an embodiment of a GUI 1200 of scheduler 135, in which in the first area 1205 "Job Definitions" menu item is chosen. The second area 1210 lists the job definitions 141-143 currently deployed in scheduler 135. When selecting one of the listed job definitions, the third area 1215 provides detailed information for the currently selected job definition, as illustrated in the figure.

Referring again to FIG. 1, scheduler runtime module 140 includes scheduler APIs 175 to provide a plurality of runtime services to jobs 131-133 during execution of their instances. Scheduler APIs 175 contain job context module 176 and intercept module 177. Job context module 176 in communication with intercept module 177 provides the running instances of jobs 13 1-133 with access to functions 178. Intercept module 177 instantiates execution context for a job in response to the invoking message sent from scheduler runtime module 140 to the job.

As a runtime object, an instance of a job accesses the scheduler runtime module 140 through scheduler APIs 175. The scheduler APIs 175 are accessible by the running instances of the deployed MDBs. For example, an instance of the job could delete obsolete schedule data. Subsequently, the job instance is authorized to call methods or functions 178 from the job context module 176. Every running job instance has an execution job context instance provided by job context module 176. During runtime, the job instance obtains a reference to its execution job context. Through the job context module 176, an instance of a job could:

read data specified in the schedule task that is pertinent to the execution of the instance of the job,
provide output from the execution of the job instance,
report a status of the instance of the job,
execute child jobs and retrieve child job objects,
wait until one or multiple child jobs have completed,
check for external events which request this job to end, or
set a return code for the job.

The job return code is an integer value output by the job and stored in the storage 115. The return code is used by the job to communicate information. In one embodiment, the default value of the return code may be "0" to indicate that the job completed successfully. Further, the job context module 176 is security aware.

Intercept module 177 further establish security context to allow execution if certain user privileges requirements are met, and instantiate logging to write logs of job's execution to storage 115. The instances of jobs 131-133 are executed assuming the privileges of a user that scheduled the corresponding tasks. This is independent of a currently logged on user or users. Child jobs inherit the privileges of their parent jobs. Particular system functionalities that require higher privileges could be inaccessible for the executed job instances.

Referring again to FIG. 1, implemented jobs 131-133 are invoked when a message is sent to them by scheduler runtime module 140. According to Java EE specification, onMessage( ) method is the standard business method of message driven beans. However, in the presented embodiment of the invention, jobs 131-133 cannot implement the onMessage( ) method because it is implemented by intercept module 177 in order to establish execution context in job context 176. Therefore, each job 131-133 implements a single business onJob( ) method. This implementation is illustrated with OnJob module 134 within job A 131. The unit of work performed by the instances of the job is programmed within the onJob( ) method.

Figure 2:
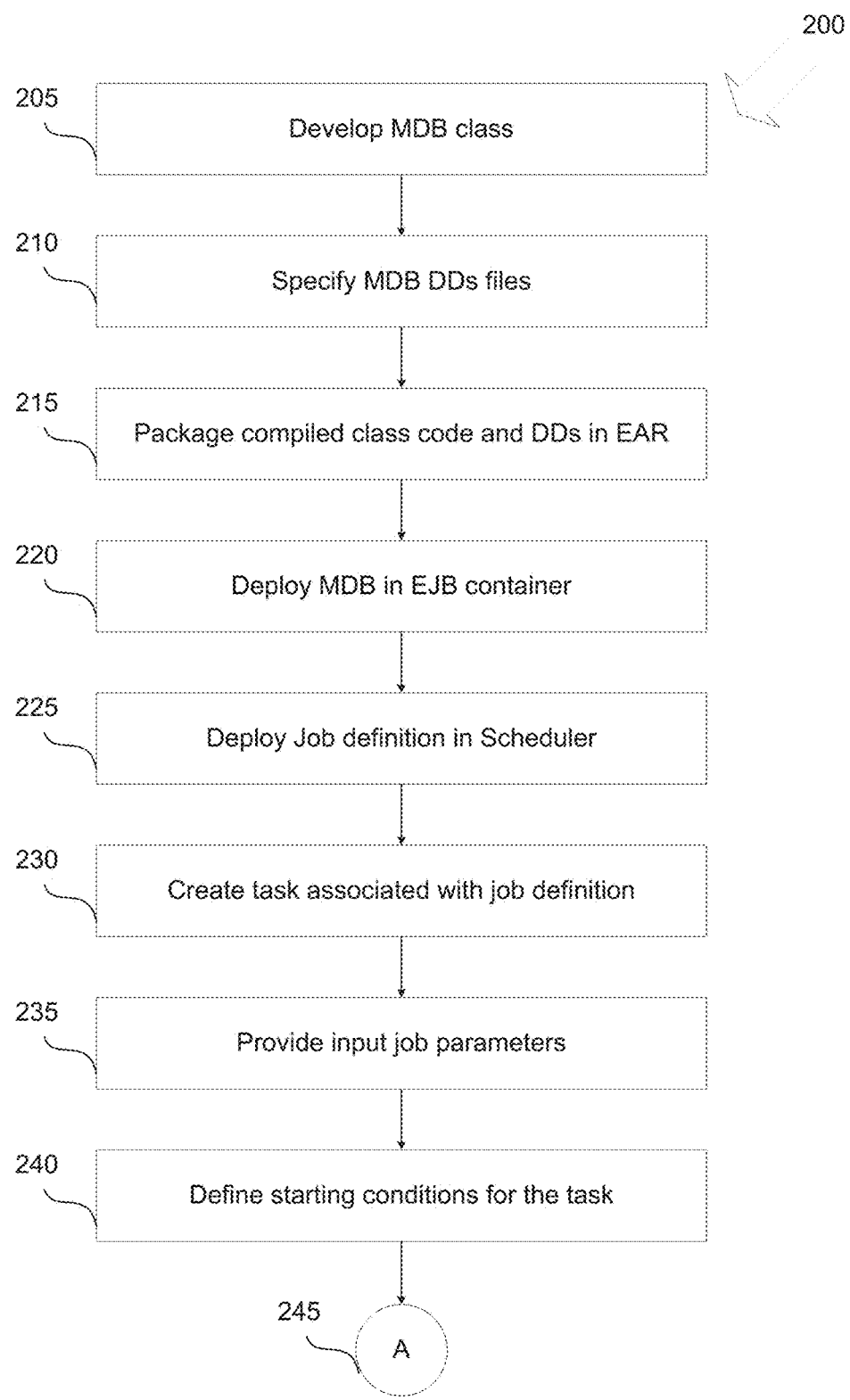
FIG. 2 illustrates a flowchart of a first part of a process to schedule, invoke asynchronously, and monitor an execution of an instance of a job, according to one embodiment of the invention.

FIG. 2 is a flowchart 200 of a first part of a process to schedule, invoke asynchronously, and monitor an execution of an instance of a job, according to an embodiment of the invention. The process starts at block 205 with development of the job MDB classes. This involves the actual programming of the business logic or the units of work that will be executed on an application server. At block 205, the job is defined as an MDB object. The developed MDB class further provides data for implementation of the business logic on the application server.

Figure 3:
FIG. 3 illustrates a sample source code of a message driven bean (MDB) class that logs a message in a job log, according to one embodiment of the invention.

FIG. 3 is a sample source code 300 of an MDB class that logs a "Hello World!" message in a database, according to one embodiment of the invention. An import section of this MDB class is specified at section 305. As discussed above, an instance of the job is executed when it receives a Java Messaging Service (JMS) message from the scheduler. A message selector is used to restrict the messages that are received from the JMS. In other words, the message selector addresses the JMS message to the correct job. A particular instance of the job is further identified by sending job ID with the message.

At section 310, a value of the message selector is specified. By using the "ActivationConfig" element of the "MessageDriven" annotation, the job MDB class specifies the value of the message selector. In one embodiment, the message is in the following format: JobDefinition='<Job name>'. <Job name> may contain any valid message selector string literal composed of letters, digits, hyphens, and underscores. <Job name> has to be specified in the additional job definition deployment descriptor that is deployed in the scheduler. The <Job name> value in the MDB class has to be identical to the one in the job definition deployment descriptor.

Deployed MDB objects are associated with a JMS queue. Instances of the jobs that are deployed as MDB objects could be invoked asynchronously by sending messages via the JMS queue. The job MDB class specifies javaxjms.Queue as the destination type at section 315 by using "ActivationConfig" element of the "MessageDriven" annotation.

At section 320, the single business method onJob( ) of the MDB class is implemented. The job MDB inherits from an "MDBJobImplementation" base class that itself provides an implementation of the onMessage( ) method. "MDBJobImplementation" base class is implemented in the scheduler, and more specifically in intercept module 177, as described above in reference to FIG. 1. In the implementation of the onJob( ) method the unit of work that an instance of the job should perform is executed when the method receives a JMS message.

Referring again to FIG. 2, at block 210, deployment descriptor (DD) files of the job MDB are specified. In one embodiment, DDs files are in extensible markup language (XML) format that provide metadata for the jobs. In alternative embodiment of the invention, the metadata for the job may be provided with other means such as annotations or vendor specific deployment tools. There are different kinds of metadata, depending on their purpose. As described here, metadata is used for setting up the system and execution environment of the deployed message-driven bean (MDB). Metadata is also used for scheduling executions of instances of the deployed job MDBs.

In one embodiment, the metadata for each job MDB is split in three DD files that are deployed on the application server. Two of the three DD files provide metadata to the EJB container. These two DD files may be named "ejb-j2ee-engine.xml" and "application-j2ee-engine.xml", and in this document are referenced as common deployment descriptors for message-driven beans. The third file is a specific or additional DD file that provides metadata to the scheduler. This DD file may be named "job-definition.xml". The metadata of "job-definition.xml" contain job definitions necessary for scheduling execution of instances of the deployed job MDBs. The three files are vendor specific and are not part of Java EE specification.

The deployment descriptor "ejb-j2ee-engine.xml" provides job MDB metadata to the EJB container that is used to setup general parameters of Java EE engine for the respective job MDB. FIG. 4A is an example "ejb-j2ee-engine.xml" DD file 400, according to an embodiment of the invention. The illustrated DD file specifies the destination name and connection factory name which the job MDB uses. The destination name is "JobQueue", and the connection factory name is "JobQueueFactory". The example shows the "ejb-j2ee-engine.xml" deployment descriptor for the "HelloWorld" job whose MDB class is named "HelloWorldBean". In an alternative embodiment of the invention, rather than using this DD file, an arbitrary JMS queue could be defined with annotations in the MDB class.

The deployment descriptor "application-j2ee-engine.xml" provides job MDB metadata to the EJB container that is used to setup the execution environment. It incorporates a reference to the scheduler APIs containing "job context" and "MDBJobImplementation" classes. FIG. 4B shows an example of the "application-j2ee-engine.xml" DD file 405 for the "HelloWorld" job, created in an EJB project named "HelloWorldProject".

The additional deployment descriptor "job-definition.xml" provides additional metadata to the scheduler. The additional metadata contains job definitions of the deployed job MDBs. In the scheduler, this metadata is used to schedule the execution of the instances of the jobs. The additional DD file specifies the name and description of a job, and names and properties of the job parameters, when the job requires input or output parameters. The additional DD file also specifies a retention period for the persisted job-related data, e.g., for the execution logs of the job instances. FIG. 4C shows an example "job-definition.xml" deployment descriptor file 410 for the job "HelloWorld" that only logs a "Hello World" ! message and has no job parameters. The job definition name has to be identical with the value of the message selector specified in the job MDB class.

Figure 5:
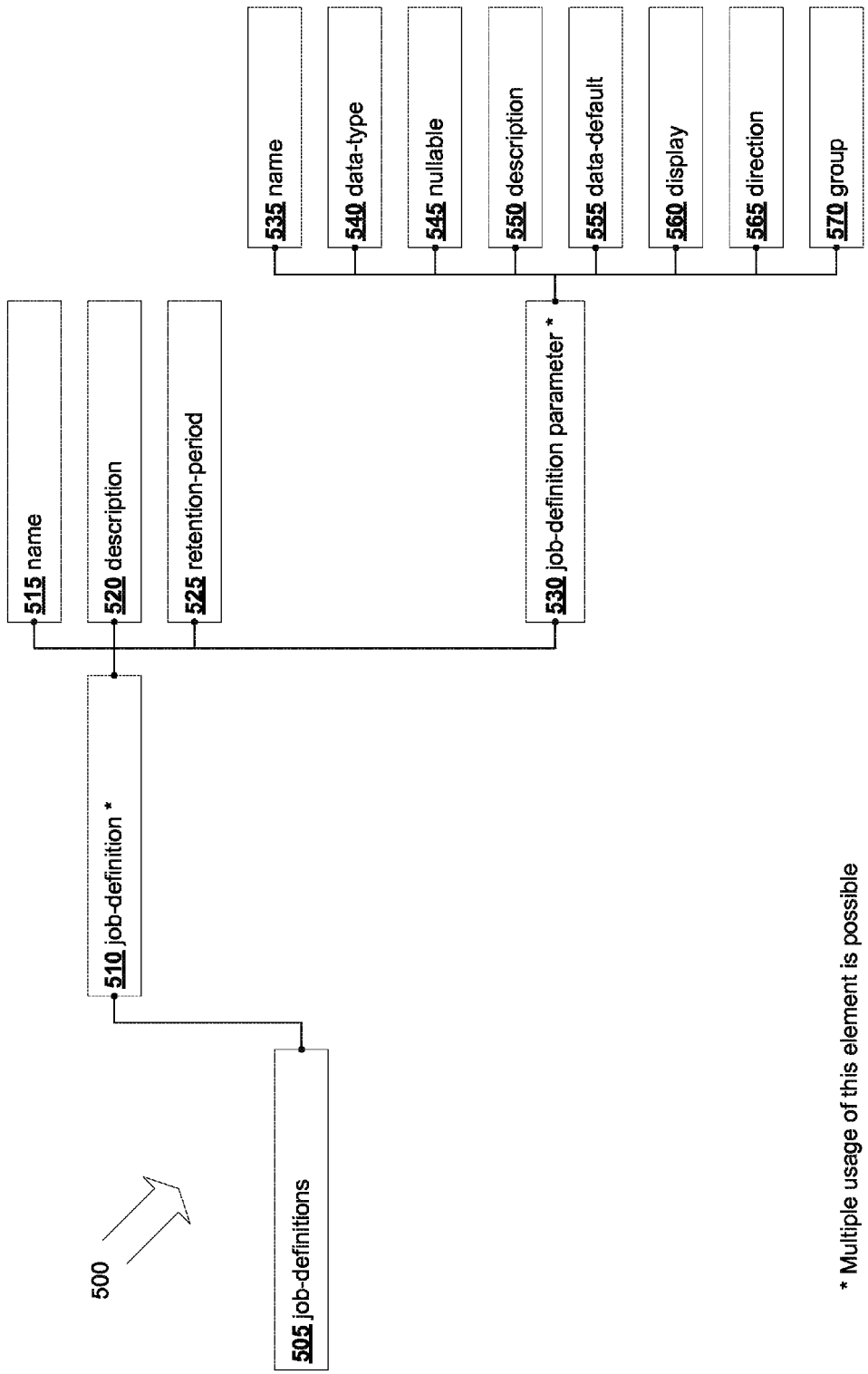
FIG. 5 illustrates a block diagram of a document type definition for a deployment descriptor that provides job definition metadata to scheduler, according to one embodiment of the invention.

FIG. 5 is a block diagram 500 of a document type definition (DTD) for the "job-definition.xml" deployment descriptor. The following table comprises a description of the elements of the DTD of the "job-definition.xml" DD file:

| Ref | "job-definition.xml" DTD Element/Attribute | Description |
| --- | --- | --- |
| 505 | job-definitions | The root element of this deployment descriptor. It contains additional information about one or more job definitions. |
| 510 | job-definition | This element contains additional information about one job definition. Multiple usage of the element in DDs is possible. |
| 515 | Name | The name of the job definition. The value of this attribute has to be the same as the value of the message selector specified in the job MDB class. The job definition is displayed with this name in the scheduler |
| 520 | description | A free text description of the job definition. The description is displayed in the scheduler. |
| 525 | retention-period | Determines the number of days, for which the job record and job logs are persisted in the database. The possible values are:<br>Positive number (n) - Keep the job for the specified n days.<br>0 - Do not keep the job logs<br>−1 - Keep the job logs forever |
| 530 | job-definition-parameter | This element contains additional information about job parameters. Multiple usage of the element in DDs is possible. |
| 535 | name | The name of the parameter. The parameter name you specify here has to be the same as the name you specify for the parameter in the job MDB class. |
| 540 | data-type | The type of data passed by the parameter. The supported data types are: string, float, double, integer, long, Boolean, date, and properties. |
| 545 | nullable | Defines whether the parameter must be specified when a scheduler task is created for the job definition. The possible values are:<br>N - The parameter has to be specified.<br>Y - The parameter does have to be specified.<br>If you do not specify a value, the element takes N as its default value. |
| 550 | description | A free text description of the parameter. The description is displayed in the scheduler. |
| 555 | data-default | The default value that the parameter takes if no value is explicitly specified when a scheduler task is created for the job definition. |
| 560 | display | Specifies whether the parameter appears in the user interface when the job is scheduled. The possible values are:<br>Y - The parameter is displayed.<br>N - The parameter is not displayed. |
| 565 | direction | Specifies whether the parameter is incoming or outgoing for the job. The following directions are possible:<br>IN - The parameter is passed to the job. The parameter value provides input for the job to process.<br>OUT - The parameter is passed from the job. The parameter value is the job's output.<br>INOUT - The parameter is passed to the job, the job processes it, and then passes it out.<br>The values of all parameters from the execution of each job instance are stored in the database. The parameter values from a job execution are not overwritten with the parameter values from successive job executions.<br>For example, if a job that has OUT parameters |

| Ref | "job-definition.xml" DTD Element/Attribute | Description |
|---|---|---|
| | | runs twice, the values of the OUT parameters for each of the two job executions is persisted. The value of the OUT parameter from the second job execution does not overwrite the value of the OUT parameter from the first job execution. |
| 570 | group | Job parameters can be grouped in the scheduler Administrator to improve readability. This property defines the group in which a parameter shows in the scheduler Administrator. |

Referring again to FIG. 2, the process continues with packaging a compiled version of the job MDB class together with all DD files in an Enterprise Application Archive (EAR) at block 215. Such an EAR is ready to be deployed on an application server by a deployer. The deployer is a special infrastructure or a module in the applications server. At block 220, the class and the first two common DDs are deployed in EJB container of the Java AS. The additional "job-definition.xml" DD is deployed in scheduler at block 225. Deploying the metadata means reading it by EJB container and by scheduler, respectively. The deployment is usually executed as a single operation, where EJB container and scheduler receive the pertinent data.

At block 230, a scheduler task is created in the scheduler. The task is associated with a deployed job definition (additional metadata for a job MDB). The task may be created manually, by a program, or from a predefined template. The scheduler task is used to invoke execution of one or more instances of the corresponding job. At block 235, input parameters for the corresponding job are specified in the scheduler task. These parameters are required during the execution of the instances of the corresponding job.

The number and the type of the parameters are predefined by the job definition, as described earlier. Whether parameters will be required depend on the business logic of the job. For example, instead of coding the message "Hello World!" in the job MDB class as shown in FIG. 3, a parameter of type string could be defined in job definition DD. Thus, the message that is logged will be specified when a scheduler task is created for that job.

At block 240 a start condition for the created scheduler task is defined. The scheduler task starts every time the specified start condition is fulfilled. The task triggers or invokes an execution of an instance of the corresponding job and provides the input parameters.

In the scheduler, a task could be scheduled to start when a particular time comes, according to an embodiment of the invention. There are several possible types of time-based start conditions that could be specified. One possibility is to start the task once or periodically at a particular time. This type of time-based start conditions is called recurrent execution, where the task is started once at a particular date and time, and then starts recurrently at specified regular intervals for predefined period or number of times. To start the task only once is a special case where the task has a single iteration.

Another possible type of time-based start condition is known as a cron execution. In this case, the task starts once or periodically on a day that is relative to the start or end of month or week. The cron start condition defines the minute, the hour, the day of week and/or month, and the year when the task starts. The task starts once at the specified time. Further, the task starts at the specified intervals. The task can be set to start one or more times within a predefined period at regular intervals. The table below provides examples of the various time-based start conditions could be used to schedule tasks:

| Start Condition | Example |
|---|---|
| Recurrent | |
| Once | Start the task on December 24 at 6 PM. |
| Periodic | Start the task on Monday October 24 at 10 AM and repeat 10 times every 24 hours. |
| | Start the task on Monday, October 24 at 8AM and repeat every 10 minutes until 6PM on the same day. |
| Cron | |
| Once | Start the task on the first weekend in January in 2010. |
| Periodic | Start the task every weekday at 8:10 AM. |
| | Start the task every weekday, every quarter of an hour between 8 AM and 6 PM in 2010. |

Figure 6:
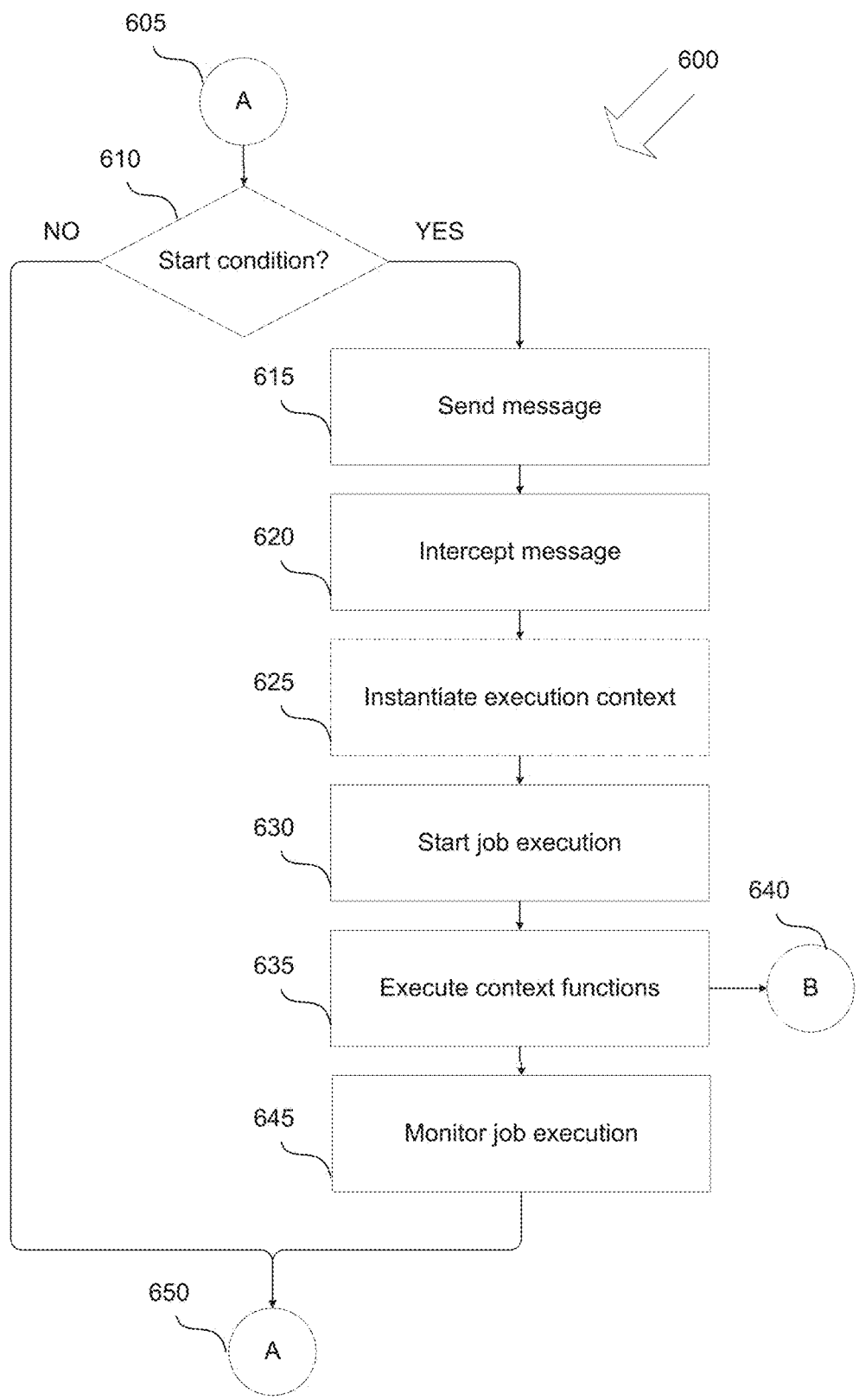
FIG. 6 illustrates a flowchart of a second part of a process to schedule, invoke asynchronously, and monitor an execution of an instance of a job, according to one embodiment of the invention.

At block 245, the process of FIG. 2 continues in FIG. 6. FIG. 6 is a flowchart 600 of a second part of a process to schedule, invoke asynchronously, and monitor an execution of an instance of a job, according to an embodiment of the invention. The second part of the process starts at block 605 and, at block 610, scheduler checks whether the starting condition has occurred.

At block 615, scheduler sends a JMS message to EJB container to invoke an execution of an instance of the job. More specifically, the message is sent by scheduler runtime service, as described above in reference to FIG. 1. At block 620, the scheduler intercepts the issued message. In Java EE specification, EJB container provides OnMessage( ) method to the MDB. MDBs implement onMessage( ) method in order to execute the intended business functionality. In one embodiment, onMessage( ) method is implemented in the scheduler. An EJB listener registers the message and onMessage( ) method is triggered in the scheduler. In this way, the scheduler intercepts the message that is routed to the job MDB through the JMS queue. The job MDB implements an additional method onJob( ) in order to execute the intended business logic in response to the message.

One of the functions of onMessage( ) method is to instantiate an execution context at block 625 in the scheduler. The instantiated execution context provides a number of runtime services or functions to the instance of the job that is invoked for execution based on the message at 630. At block 635, the instance of the job running in the EJB container executes one or more of the functions provided by the execution context instance on scheduler. The status of the execution is monitored at block 645. The process illustrated with flowchart 600 ends at block 650. In case of periodic job execution, blocks 605 through 650 repeat until the corresponding scheduler task expires or is suspended.

Figure 7:
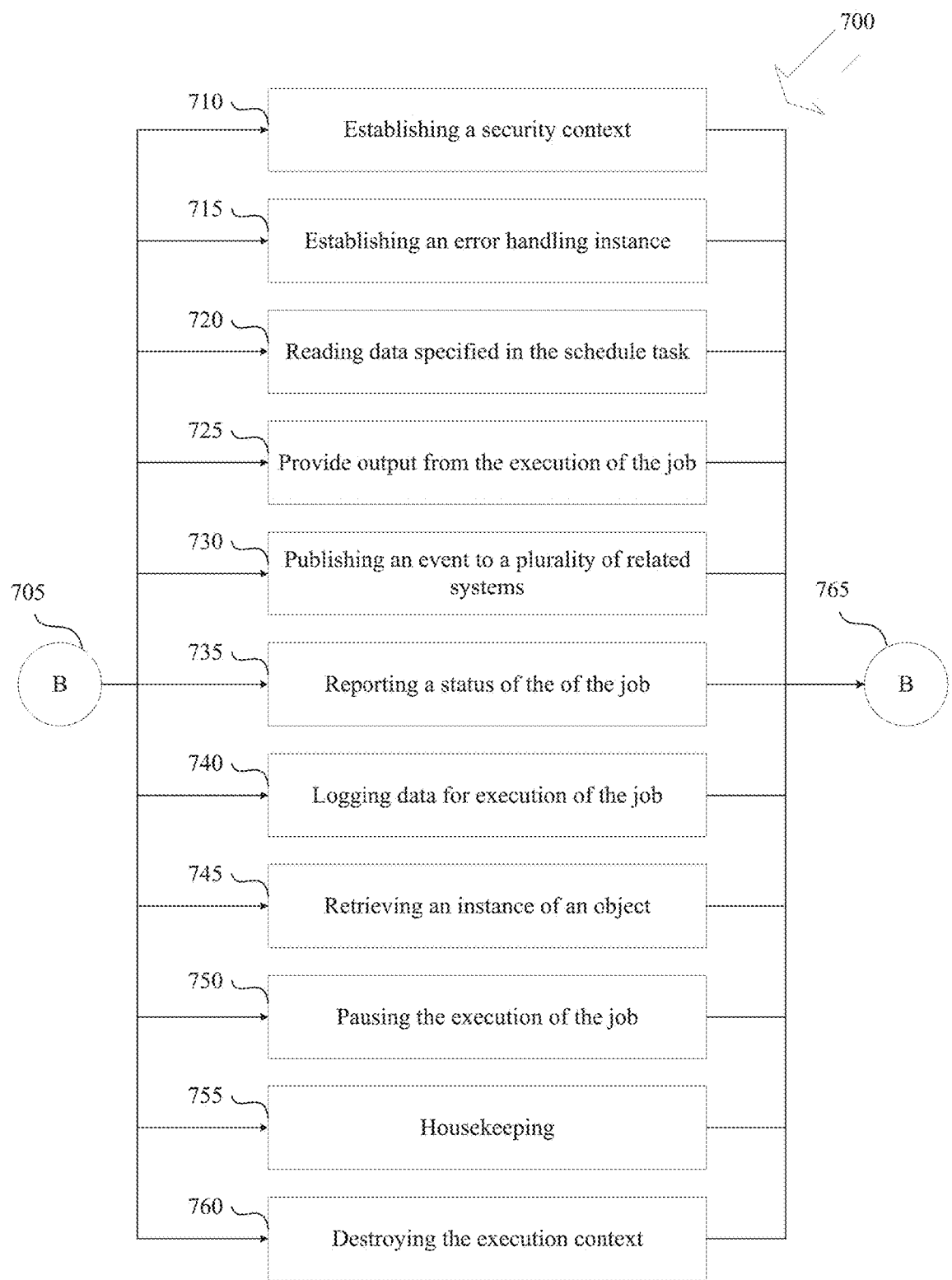
FIG. 7 illustrates a flowchart of a process to execute job context functions during an execution of an instance of a job, according to one embodiment of the invention.

At block 640, the execution of context functions refers to FIG. 7 that is a flowchart 700 of a process to execute a number of functions provided by the job context. The process of flowchart 700 starts at block 705 and ends at block 765. This process is executed by the running instance of the job as many times as required. The different functions, that are provided by the execution context at the scheduler, are denoted with blocks 720, 725, 735, 740, 745, and 750.

A function available to the running instance of the job through the execution context allows reading data from the scheduler. This function is illustrated at block 720. This function or service allows reading of input parameters for the execution of the instance of the job. The parameters are specified in the scheduler during job execution scheduling. Other kinds of information from the scheduler could also be read. For example, an instruction for the job execution could be entered in the scheduler and referred by the business logic of the running instance of the job, e.g. "stop execution". In addition, this function may be applied for prompting a user input.

At block 725, the running instance of the job provides or sends data to the scheduler. For example, this information could be an output parameter of the job, specified in the job definition DD. Similar to this function are the functions illustrated at blocks 735 and 740.

At block 735, running instance of the job reports its status, e.g., whether its unit of work is completed. Scheduler uses this information to report status of the scheduled job. The status of a scheduler job signifies the job condition at a certain point in the job's life cycle. A job can be only in one status at a time. According to the presented embodiment of the invention, a job can be in any of the six job statuses outlined in the table below:

| Status | Meaning |
| --- | --- |
| Starting | The job is currently being started. This status is possible when a JMS message was sent to trigger the job but the job has not yet received it. This delay in the JMS message receipt is possible if currently there are not enough threads to run a job. |
| Running | The job is currently performing its unit of work. |
| Completed | The job has finished its unit of work. |
| Error | The job has completed its unit of work but threw an exception during execution, or it is clear that the job has failed due to certain problems. |
| Unknown | The state of the job is not known. This status is possible when a node, during its start up, detects that there are jobs currently running on it. |
| Canceled | The execution of the job was stopped |

At block 740, running instance of the job instantiate a logging context and stores all relevant execution information in a database or storage. The scheduler could use a standard logging framework to log messages on job level, and on scheduler level. Logs at job level, or job logs, are logged in the database by every running instance of a job. The following rules apply for job logs:
 a job log is always associated with the job instance that logged it, the lifetime of the job log matches the lifetime of the job;
 the log for a job is deleted when the corresponding job is deleted, for example when the job's retention period specified in job definition DD has expired;
 job logs are not overwritten by a rolling log write strategy, logs for jobs which are kept for an indefinite period of time cannot be deleted; and job logs retrieve a log written by a particular job no matter on which node of a cluster the job ran, or whether the node where the job ran is still part of the cluster.

Blocks 745 and 750 represent two functions oriented for managing child job executions. At block 745, an instance of a child object is retrieved. This function is applied when a deployed job of a child job is instantiated by the running instance of the parent job. At block 750, the execution of the running instance is paused until the execution of an instantiated child job is completed.

Figure 8A:
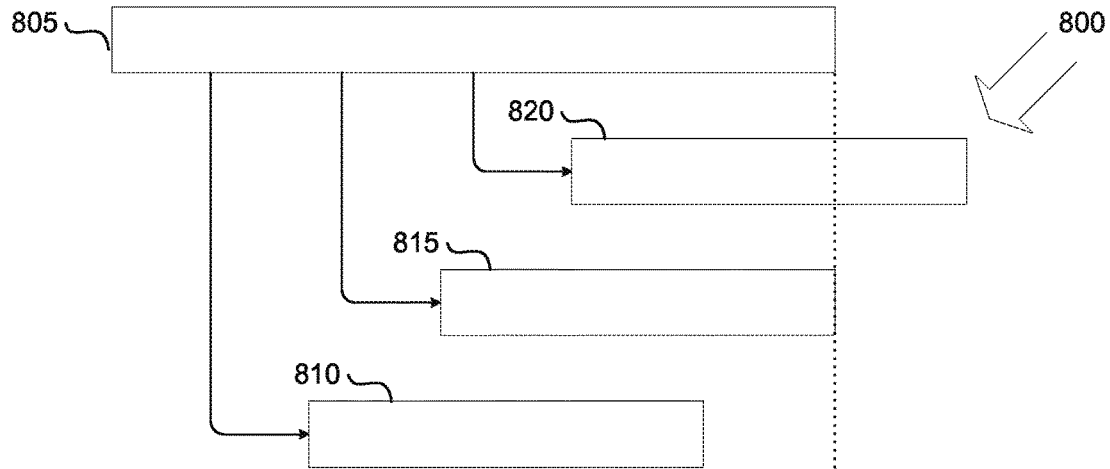
FIG. 8A illustrates a flowchart of a process to execute instances of child jobs by a parent job, according to one embodiment of the invention.

FIG. 8A is a flowchart 800 of a process to execute instances of child jobs by a parent job, according to an embodiment of the invention. Parent job 805 uses the function illustrated with block 745 in FIG. 7 to instantiate and run child jobs 810, 815 and 820. The instances of the child jobs could be executed in parallel.

Figure 8B:
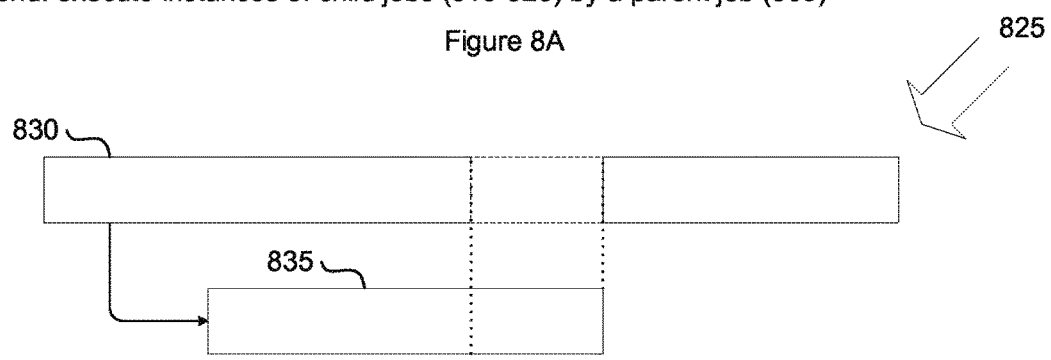
FIG. 8B illustrates a flowchart of a process to pause an execution of a parent job while an instance of a child job is executed, according to one embodiment of the invention.

FIG. 8B is a flowchart 825 of a process to pause the execution of the instance of a parent job while an instance of a child job executes. Parent job 830 uses the function illustrated with block 750 in FIG. 7 to pause its execution until the execution of child job 835 is completed. The pausing of the execution of the instance of the parent job could be required for a specific period during the execution of the instance of the child job.

Figure 8C:
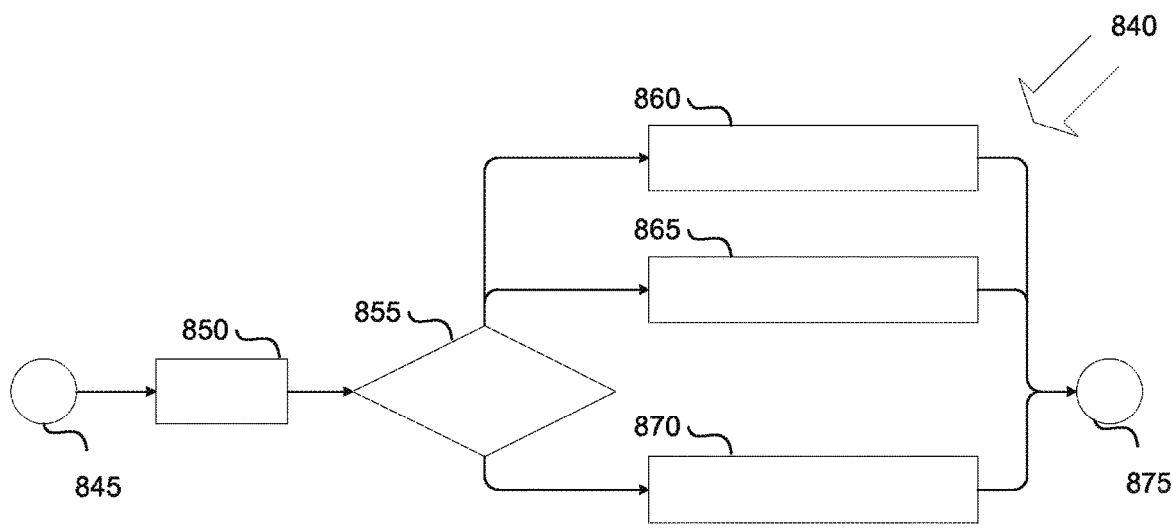
FIG. 8C illustrates a flowchart of a process to execute a chain of instances of child job, according to one embodiment of the invention.

FIG. 8C is a flowchart 840 of a process to execute a chain of instances of child jobs. The chain is started by the instance of a parent job at block 845. First, child job 850 is executed, and then, the chain continues with block 855. Block 855 represents a logical operation in the chain of child jobs. For example, a user could be prompted for providing an input, or making a decision. Depending on the logical condition or on the user input, the chain of child jobs continues with the parallel execution of child jobs 860 and 865, or with the execution of child job 870. The chain ends at block 875. The execution of the instance of the parent job could continue in parallel to the chain of child job executions, or could be paused as required.

The execution context provides interaction between the running instances of the scheduling jobs and the scheduler. However, in alternate embodiments, the execution context may not be required. In such embodiments, the jobs are scheduled and instantiated with JMS messages or other kinds of asynchronous triggering. Alternative status reporting and logging of the job execution to the scheduler could be used, e.g., using vendor specific logging frameworks or APIs.

Figure 9A:
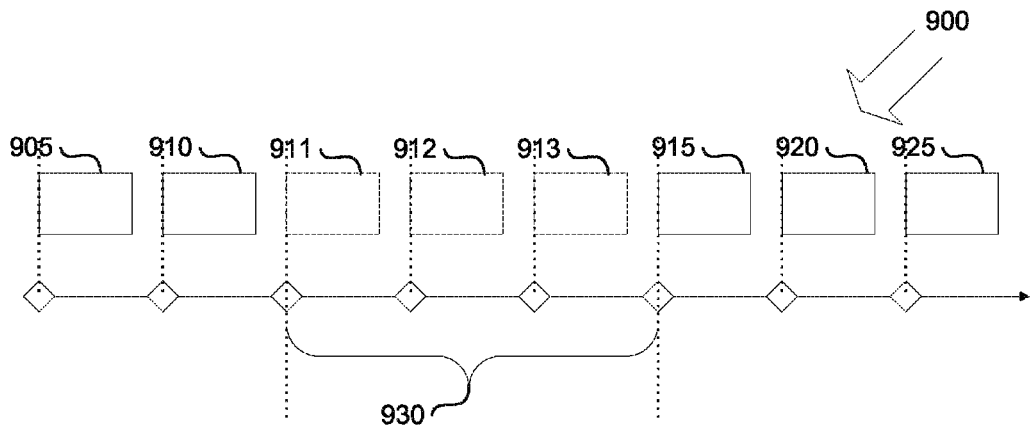
FIG. 9A illustrates a run-chart diagram of interrupting periodic executions of instances of a job, according to one embodiment of the invention.
Figure 9B:
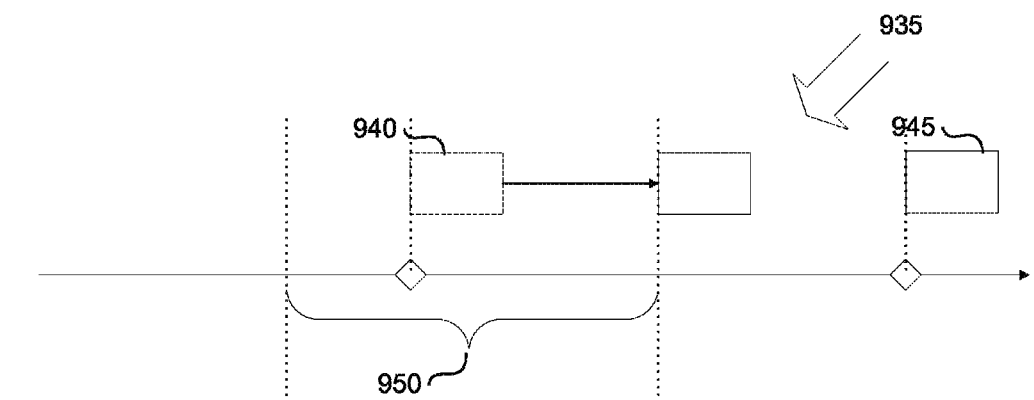
FIG. 9B illustrates a run-chart diagram of delaying periodic execution of an instance of a job, according to one embodiment of the invention.
Figure 9C:
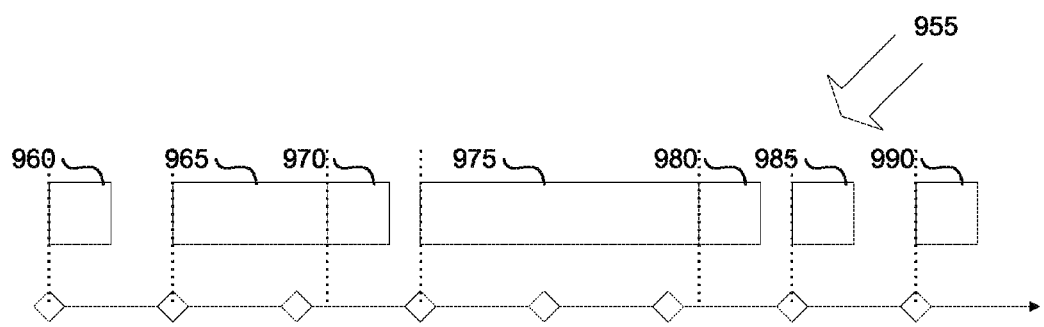
FIG. 9C illustrates a run-chart diagram of a process to resolve execution conflicts between instances of a job, according to one embodiment of the invention.

FIGS. 9A, 9B, and 9C outline the behavior of periodic executions of instances of a job, either cron or recurrent, and the changes that apply to execution times in the case of irregular circumstances such as system interruptions, time shift, time delay, execution overlap, etc. FIG. 9A is an embodiment of a run-chart diagram 900 of interrupting periodic executions of instances of a job. The execution of the job instances is illustrated at blocks 905, 910, 911, 912, 913, 915, 920, and 925. The instances start at regular time intervals, as shown in the figure. The execution of instances of the job is stopped for a period 930. For example, the interruption of the execution could be caused by a system stop for period 930 or simply by system time shift with period 930. After the period 930, the periodic instances execution resumes with instance 915 at the intended time. Job instances 911- 913 which execution was due within the period 930 are skipped.

FIG. 9B is an embodiment of a run-chart diagram 935 of delaying periodic execution of instances of a job. The job instances are illustrated at blocks 940 through 945. Execution of job instance 940 may be delayed because of a certain event taking place within the period 950. The execution of job instance 940 is postponed to after period 950, as illustrated in the figure. If the period 950 continues more than one execution period, job instances 940 and 945 could either be executed in parallel or the execution of job instance 940 could be skipped.

FIG. 9C is an embodiment of a run-chart diagram 955 of a process to resolve execution conflicts between instances of a job. The job instances are illustrated at blocks 960, 965, 970, 975, 980, 985, and 990. In this embodiment, an execution of job instance 960 is within the execution period, however, the execution of job instance 965 takes longer to finish after the execution of job instance 970 is due. In this case, job instance 970 is postponed to start after the execution of job instance 965. Alternatively, the execution of job instance 970 could start on its due time in parallel with job instance 965. The execution of job instance 975 may take longer than expected and cross several execution periods. In an embodiment, only one periodic job instance 980 is started after the job instance 975 is completed. The job instances that were due during the execution of job instance 975 are skipped. Alternatively, all due job instances could be started in parallel, but this could cause a system overload.

In the above description numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Reference throughout this specification to "one embodiment" or "an embodiment" means that a particular feature, structure or characteristic described in connection with the embodiment is included in at least embodiment of the invention. Thus, the appearance of the phrases "in one embodiment" or "in an embodiment" in various places throughout this specification are not necessarily all referring to the same embodiment. Furthermore, the particular features, structures or characteristics may be combined in any suitable manner in one or more embodiments.

What is claimed is:

1. A computerized method comprising:
   deploying environment metadata of a job in a first execution environment running a first plurality of software components installed therein, wherein the job is a software component deployable and executable in the first execution environment;
   deploying additional metadata of the job in a second execution environment running a second plurality of software components installed therein, wherein the first execution environment and the second execution environment are separately provided at an application server;
   creating a scheduler task in the second execution environment based on the additional metadata of the job, wherein the scheduler task is associated with a starting condition;
   starting the scheduler task at the second execution environment based on an occurrence of the starting condition; and
   invoking asynchronously an execution of an instance of the job at the first execution environment in response to the starting of the scheduler task in the second execution environment.

2. The method of claim 1, wherein creating the scheduler task comprises:
   specifying one of a recurrent and a cron starting time condition for the scheduler task.

3. The method of claim 2 further comprising:
   invoking asynchronously an execution of a second instance of the job at the first execution environment in response to a second occurrence of the starting condition.

4. The method of claim 1, wherein creating a scheduler task comprises:
   specifying one or more parameters for the job, wherein the one or more parameters are required by an instance of the job during execution.

5. The method of claim 1, wherein invoking asynchronously the execution of the instance of the job comprises:
   sending an asynchronous message from the second execution environment to the job in the first execution environment.

6. The method of claim 5 further comprises: sending an asynchronous Java Messaging System (JMS) interface message to a message driven bean (MDB) deployed on a Java Enterprise Edition (Java EE) Application Server (AS).

7. The method of claim 5, wherein sending the asynchronous message comprises:
   including a job name in the asynchronous message to address the asynchronous message to the correct job implementation applying message selector, wherein the job name is specified in the additional metadata of the job.

8. The method of claim 1, wherein invoking asynchronously the execution of the instance of the job comprises:
   instantiating a job context at the second execution environment for the instance of the job in response to the invoking of the execution of the instance of the job; and
   providing a plurality of runtime functions by the job context at the second execution environment to the instance of the job executed at the first execution environment.

9. The method of claim 8 further comprising:
   sending an asynchronous Java Messaging System (JMS) interface message from a scheduler to a message driven bean (MDB) object deployed in an Enterprise JavaBean (EJB) container on a Java Enterprise Edition (Java EE) Application Server (AS), wherein the scheduler represents the second execution environment, and the EJB container represents the first execution environment;
   instantiating a job context class at the scheduler for an instance of the MDB object in response to a receiving of the asynchronous JMS interface message at the EJB container;
   invoking the execution of the instance of the MDB object at the EJB container based on the asynchronous JMS interface message, the job context class providing a plurality of runtime services to the instance of the MDB object at the scheduler during the execution.

10. The method of claim 9, wherein the invoking the execution of the instance of the MDB object comprises:
    triggering a second business method of the MDB object based on the asynchronous JMS interface message; and
    providing a plurality of job context services to the instance of the MDB object by passing a reference to the job context as a parameter of the second business method of the MDB object.

11. A computer system comprising:
    a deployer to deploy environment metadata for a job and additional metadata for the job, the job being a software component deployable on an application server;

a container running on the application server to establish a first execution environment to receive the environment metadata and to execute the deployed job, wherein the first execution environment is running a plurality of software components deployed in the container; and a scheduler running on the application server to establish a second execution environment running a plurality of software components deployed on the scheduler, the second execution environment to receive the additional metadata for the job, the scheduler including a processor to execute a logic to create a scheduler task based on the additional metadata of the job, and to instantiate an execution of the scheduler task in the second execution environment, wherein the first execution environment and the second execution environment are separate execution environments.

12. The system of claim 11, wherein the container is an Enterprise JavaBean (EJB) container running on Java Enterprise Edition (Java EE) application server (AS) to receive standard metadata for a Message Driven Bean (MDB) object and to hold a deployed MDB object.

13. The system of claim 11, wherein the scheduler is running on the Java EE AS to receive the additional metadata for the deployed MDB object.

14. The system of claim 11 further comprising: a messaging queue to send an asynchronous invocation message from the second execution environment established by the scheduler to the job held by the first execution environment.

15. The system of claim 14, wherein the messaging queue is a Java Messaging System queue to send asynchronous messages from the scheduler to the MDB object held in the EJB container.

16. The system of claim 11, wherein the scheduler comprises:
a scheduler runtime service to receive the additional metadata and to send an asynchronous message to the job; and
a list of tasks to hold the generated scheduler task associated with the job.

17. The system of claim 11, wherein the second execution environment comprises:
an execution context module to provide a plurality of runtime functions to the job; and
an intercept module to intercept an invocation message sent to the job and to instantiate an execution context.

18. The system of claim 11, wherein the job implements a business method to trigger a job execution based on an invocation message.

19. The system of claim 11 further comprising:
a user interface coupled to a processor, the user interface to be used to:
create tasks associated with one or more job definitions, the job definitions provided with the additional metadata;
define a plurality of starting conditions for the tasks;
visualize the tasks, the one or more job definitions and started jobs; and
provide access to a detailed information comprising metadata and logs based on execution of the job.

* * * * *